(12) United States Patent
Risseeuw et al.

(10) Patent No.: US 11,959,639 B2
(45) Date of Patent: Apr. 16, 2024

(54) METHOD FOR REDUCING $NO_x$ EMISSION

(71) Applicant: TECHNIP FRANCE, Courbevoie (FR)

(72) Inventors: Izaak Jacobus Risseeuw, Zoetermeer (NL); Johannes Antonie de Jager, Zoetermeer (NL); Jelle-Gerard Wijnja, The Hague (NL)

(73) Assignee: TECHNIP FRANCE, Courbevoie (FR)

( * ) Notice: Subject to any disclaimer, the term of this patent is extended or adjusted under 35 U.S.C. 154(b) by 439 days.

(21) Appl. No.: 16/330,651

(22) PCT Filed: Sep. 5, 2017

(86) PCT No.: PCT/EP2017/072181
§ 371 (c)(1),
(2) Date: Mar. 5, 2019

(87) PCT Pub. No.: WO2018/042051
PCT Pub. Date: Mar. 8, 2018

(65) Prior Publication Data
US 2020/0378599 A1 Dec. 3, 2020

(30) Foreign Application Priority Data
Sep. 5, 2016 (EP) .................................... 16187239

(51) Int. Cl.
*F23L 7/00* (2006.01)
*F23C 99/00* (2006.01)
(Continued)

(52) U.S. Cl.
CPC ............ *F23L 7/005* (2013.01); *F23C 99/008* (2013.01); *F23D 14/66* (2013.01); *F23D 14/68* (2013.01);
(Continued)

(58) Field of Classification Search
CPC .... F23C 99/008; F02D 2250/36; F23L 7/002; F23L 7/005; F23L 15/00; F23L 15/02;
(Continued)

(56) References Cited

U.S. PATENT DOCUMENTS

| 4,089,639 A | * | 5/1978 | Reed | ...................... F23L 7/005 |
| | | | | 431/11 |
| 4,148,599 A | * | 4/1979 | Reed | ..................... F23D 17/002 |
| | | | | 431/11 |

(Continued)

FOREIGN PATENT DOCUMENTS

| CN | 1204754 A | 1/1999 |
| CN | 1549382 A | 11/2004 |

(Continued)

OTHER PUBLICATIONS

Clean Air Technology Center, Nitrogen Oxides (NOx), Why and How They Are Controlled, Nov. 1999, U.S. Environmental and Protection Agency, pp. 9-10, 15-16 (Year: 1999).*

(Continued)

Primary Examiner — Jason Lau
(74) Attorney, Agent, or Firm — Locke Lord LLP; Gabrielle L. Gelozin; Christopher J. Capelli

(57) ABSTRACT

The invention is directed to a method for reducing NOx emission from an industrial process furnace comprising a firebox containing a burner and a tube, which method comprises subjecting an oxidant gas and/or a fuel gas (1) to humidification, thereby obtaining a humidified gas; and pre-heating the humidified gas with an external waste heat stream (20) before feeding the gas to the burner.

23 Claims, 2 Drawing Sheets

(51) Int. Cl.
| | |
|---|---|
| *F23D 14/66* | (2006.01) |
| *F23D 14/68* | (2006.01) |
| *F23L 15/00* | (2006.01) |
| *F23L 15/04* | (2006.01) |

(52) U.S. Cl.
CPC .... *F23L 15/04* (2013.01); *F23D 2900/14701* (2013.01); *F23J 2215/10* (2013.01); *F23K 2400/10* (2020.05); *F23L 2900/00001* (2013.01)

(58) Field of Classification Search
CPC .............. F23L 15/04; F23L 15/045; F23L 2900/00001; F23L 2900/07008; F23L 2900/07009; F23L 2900/14681; F23L 2900/14701; F23L 2900/15044; F23D 14/66; F23D 14/68; F23J 2215/10; F23J 2215/101
See application file for complete search history.

(56) References Cited

U.S. PATENT DOCUMENTS

| | | | | |
|---|---|---|---|---|
| 4,287,938 | A * | 9/1981 | Lagerquist | F23J 15/06 165/104.25 |
| 4,799,941 | A * | 1/1989 | Westermark | B01D 5/0036 95/199 |
| 4,918,916 | A * | 4/1990 | Tiberg | F23L 7/005 60/273 |
| 5,044,935 | A * | 9/1991 | Peter | F23C 7/002 431/182 |
| 5,154,599 | A * | 10/1992 | Wunning | F23B 90/06 431/215 |
| 5,178,210 | A * | 1/1993 | Guillet | F24H 1/107 165/111 |
| 5,220,888 | A * | 6/1993 | Khinkis | F23D 14/82 122/136 C |
| 5,567,398 | A * | 10/1996 | Ruhl | B01J 8/025 422/607 |
| 5,626,104 | A * | 5/1997 | Tanaka | F22G 5/02 122/367.1 |
| 5,771,823 | A | 6/1998 | Vierstra et al. | |
| 5,967,137 | A * | 10/1999 | Guillet | F24H 1/107 126/360.1 |
| 6,141,955 | A * | 11/2000 | Akiyama | F01K 21/047 60/39.15 |
| 6,159,395 | A * | 12/2000 | Early | C07C 29/1518 252/372 |
| 6,167,706 | B1 * | 1/2001 | Bronicki | F02C 3/28 60/671 |
| 6,389,794 | B2 * | 5/2002 | Ranasinghe | F01K 23/106 60/775 |
| 7,200,997 | B2 * | 4/2007 | Carlson, Jr. | F01K 21/047 60/39.55 |
| 2008/0229755 | A1 | 9/2008 | Koganezawa et al. | |
| 2009/0120338 | A1 * | 5/2009 | Adendorff | F23L 7/007 110/345 |
| 2010/0146984 | A1 * | 6/2010 | Carroni | F01K 23/067 60/775 |
| 2011/0168605 | A1 * | 7/2011 | Blevins | C10J 3/80 422/187 |
| 2012/0085339 | A1 * | 4/2012 | Eldabbagh | F24D 12/02 126/344 |
| 2012/0129112 | A1 * | 5/2012 | Cegarra Cruz | F01K 17/06 431/11 |
| 2013/0203003 | A1 * | 8/2013 | Cain | F23D 14/26 432/11 |
| 2014/0141381 | A1 * | 5/2014 | Bullinger | F26B 23/001 432/29 |
| 2014/0212823 | A1 * | 7/2014 | Novak | F23M 5/00 431/11 |

FOREIGN PATENT DOCUMENTS

| | | | | |
|---|---|---|---|---|
| CN | 1759233 | A | 4/2006 | |
| CN | 101265842 | A | 9/2008 | |
| CN | 101589271 | A | 11/2009 | |
| CN | 102292533 | A | 12/2011 | |
| CN | 102439359 | A | 5/2012 | |
| DE | 102018109185 | A1 * | 10/2019 | .............. F25B 37/00 |
| EP | 0849245 | A1 | 6/1998 | |
| EP | 0946275 | B1 * | 11/2001 | ......... C07C 29/1518 |
| EP | 1972760 | A2 | 9/2008 | |
| KR | 20090116117 | A | 11/2009 | |
| KR | 100948515 | B1 * | 3/2010 | .............. F24H 1/00 |

OTHER PUBLICATIONS

Clean Air Technology Center, Nitrogen Oxides (NOx), Why and How They Are Controlled, Nov. 1999, U.S. Environmental and Protection Agency, pp. 15-16, 18-19 (Year: 1999).*
Machine Translation of Bin et al (Year: 2010).*
Machine Translation of Stillger (Year: 2018).*
"Return Condensate to the Boiler", https://www1.eere.energy.gov/manufacturing/tech_assistance/pdfs/steam8_boiler.pdf.*
"Phase Diagram", https://en.wikipedia.org/wiki/Phase_diagram.*
International Search Report and Written Opinion of the Searching Authority for corresponding International Patent Application No. PCT/EP2017/072181 dated Dec. 13, 2017.
Chinese Office Action and English translation thereof dated Jan. 3, 2020, issued during the prosecution of Chinese Patent Application No. CN 201780067238.8.
Indian Examination Report issued during prosecution of the corresponding Indian Patent Application No. 201947013073 dated May 28, 2021.

* cited by examiner

METHOD FOR REDUCING $NO_x$ EMISSION

CROSS-REFERENCE TO RELATED APPLICATIONS

This Application is a U.S. National Stage application under 35 U.S.C. 371 of International Application No. PCT/EP2017/072181 filed Sep. 5, 2017, which claims the benefit of priority to European Patent Application No. EP 16187239.5 filed on Sep. 5, 2016, the contents of which are hereby incorporated by reference in their entirety.

BACKGROUND OF THE INVENTION

1. Field of the Invention

The invention is directed to a method for reducing $NO_x$ emission from an industrial process furnace, as well as to a method for combusting fuel gas with oxidant gas and a method for heating a tube comprising process gas.

2. Description of Related Art

Industrial process furnaces are furnaces wherein fuel is combusted to produce heat. The heat is transferred to a fluid, which typically flows through one or more tubes (for example one or more tubular coils) located inside the firebox of the industrial process furnace. An industrial process furnace may be used for providing heat to chemical reactions, for example in case of cracking or reforming processes.

Heat in an industrial process furnace is produced by combustion of fuel using oxidant gas. Generally, high temperature processes such as steam reforming of hydrocarbons to produce synthesis gas or pyrolysis of hydrocarbons to produce olefins use combustion air from atmosphere as oxidant gas source for the combustion. Generally, the combustion is conducted at or near atmospheric pressure.

In view of environmental pollution, it is important to minimize $NO_x$ emissions from industrial process furnaces. The formation of $NO_x$ depends amongst others on the temperature of the flame of the burner, and in particular the peak flame temperature. $NO_x$ pollutant production is favored by high flame temperatures.

Many different ways for reducing $NO_x$ emission in industrial process furnaces are known in the art. For example, $NO_x$ emission may be reduced by technologies based on reducing flame temperature, such as flue gas recirculation (FGR), natural gas reburning, low $NO_x$ burners (LNB) or injection of water or steam; based on chemical reduction of $NO_x$, such as fuel reburning (FR) or selective catalytic reduction (SCR); or based on oxidation of $NO_x$ with subsequent absorption, such as in a non-thermal plasma reactor; etc.

$NO_x$ emissions can be reduced by keeping the flame temperature (and in particular the peak temperature of the flame) at a relatively low value. One way of doing this is by conducting the combustion in the presence of water vapor or steam, i.e. water in the gas phase. Steam can be considered an inert medium in the combustion chamber and can reduce the combustion temperature when injected near the burners. The use of steam has the advantage that large quantities of heat can be withdrawn using relatively small amounts of inert material. This is due to the high specific heat of water and steam. As a result, the peak flame temperature can be reduced to a value at which only relatively small quantities of $NO_x$ are formed. Steam can for example be directly fed to the burner or can be mixed into the combustion air, in which case the combustion air is first humidified. Such use of steam is for example known from the following documents.

U.S. Pat. No. 4,394,118 is directed to a method for reducing $NO_x$ emissions from large furnaces using water vapor. The water vapor can be supplied to the combustion chamber together with the combustion air, for example by mixing steam and combustion air.

U.S. Pat. No. 8,703,064 describes a method for reducing mono nitrogen oxide emissions in a hydrocarbon processing furnace, wherein the floor burners of the firebox comprise a set of steam injection ports that inject steam at the burner tips, reducing flame temperature and thereby reducing thermal $NO_x$.

A disadvantage of introducing steam near the burners in order to reduce $NO_x$ emission is that it decreases the fuel efficiency of the combustion process.

A further disadvantage of using steam to reduce $NO_x$ emission is that water must be evaporated, for example in an evaporator or humidifier, before feeding it to the burners. This results in additional energy cost.

It is known in reforming processes to use the high-temperature reformed gas feed (i.e. the gas stream exiting the reformer) as an energy source to heat the humidified gas and/or to heat the water used in the humidifier. This is for example known from EP 0 946 275.

EP 0 946 275 describes a process for reforming hydrocarbonaceous feedstock and is mainly directed to the effective removal of heat from the hot reformed synthesis gas, in particular to avoid metal dusting. This is achieved by exchanging heat between the reformed synthesis gas and a pressurized and humidified vaporous mixture. The process comprises the step of humidifying a vaporous stream comprising combustion oxygen at a pressure of e.g. 5, 10 or 20 bar. This step is conducted in a saturator. A water temperature of 100° C. at the top of the saturator (humidifier) will heat the combustion air to around 96° C. Subsequently, heat is exchanged between the humidified vaporous stream comprising combustion oxygen entering the reforming zone and the synthesis gas mixture exiting the reforming zone. The synthesis gas leaving the compact reformer has a temperature of about 450° C. and about 30 bar. The hydrogen rich reformed gas is thus cooled by the vaporous stream.

A disadvantage of EP 0 946 275 is that a high-temperature waste heat stream (i.e. the reformed gas for methanol synthesis) is used for heating water and humidified gas. In state-of-the-art hydrogen plants, applications for high-temperature waste streams are often numerous and such heat can hardly be considered waste nowadays. Accordingly, using the high-temperature waste heat streams for heating water and humidified gas according to EP 0 946 275 generally does not result in an increase of the total energy efficiency of a plant.

A further disadvantage of EP 0 946 275 is that heat is exchanged between the hydrogen rich reformed gas and the humidified oxidant gas (combustion air). It is known that hydrogen is highly diffusive and that it has a wide flammability range in air, which is a safety concern, since it may quickly lead to flammable mixtures. Diffusion of hydrogen is even possible through intact materials, in particular organic materials, which may lead to gas accumulation in confined spaces.

SUMMARY OF THE INVENTION

An object of the invention is to provide an energy efficient method for reducing the $NO_x$ emission of an industrial process furnace.

In particular, an objection of the invention is to provide a method for reducing the $NO_x$ emission of an industrial process furnace, while maintaining a high efficiency of the heaters and/or a high overall efficiency of the plant.

This object was met by first humidifying either the oxidant gas (typically combustion air) or the fuel gas or both and subsequently using a low-temperature waste heat stream to superheat the humidified gas, thereby further increasing the temperature of the humidified gas.

The inventors realized that superheating the humidified oxidant gas before feeding it to the burners of an industrial process furnace may result in a significant increase in fuel efficiency, even if the increase in temperature of the gas is relatively small, e.g. in the range of 10-25° C. In regular industrial processes, one would normally not expect that such a small increase in temperature of an oxidant gas may have any significant impact on efficiency. However, the inventors found that in industrial process furnaces, especially in those using very high temperatures, the increase in fuel efficiency is already noticeable. This is a result of the temperature difference between the temperature of the humidified oxidant gas added to the burners and the flame temperature. If this temperature difference is very high, a small increase in the temperature of the humidified oxidant gas may already be sufficient to provide for a significant increase in fuel efficiency.

The inventors further realized that, considering that only a small increase in temperature is required, it is possible to provide the energy needed for superheating by using a low-temperature waste heat stream, for example waste streams having a temperature of less than 90° C. Since low-temperature waste heat streams do not have many useful applications in industrial process furnace plants, the use of this heat will directly increase the total energy efficiency of the plant. Thus, waste heat streams other than the high-temperature process gas streams exiting the firebox, such as the product gas stream and the flue gas stream) can be used for this purpose.

The inventors further realized that instead of humidifying and heating the humidified oxidant gas, an increase in efficiency may also be achieved by humidifying and subsequently heating fuel gas. Due to the fuel to oxidant ratio used in the burner, the effect on efficiency is much smaller. However, a small increase in efficiency may still be obtained in this way.

Accordingly, in a first aspect, the invention is directed to a method for reducing $NO_x$ emission from an industrial process furnace comprising a firebox containing a burner and a tube, which method comprises subjecting an oxidant gas and/or a fuel gas to humidification, thereby obtaining a humidified gas; and superheating the humidified gas by heat-exchange with a waste heat stream having a temperature below 100° C. before feeding the gas to the burner.

In a second aspect, the invention is directed to a method for combusting fuel gas with oxidant gas in an industrial process furnace comprising a firebox containing a burner and a tube, which method comprises subjecting the oxidant gas and/or the fuel gas to humidification, thereby obtaining a humidified gas; and superheating the humidified gas by heat-exchange with a waste heat stream having a temperature below 100° C. before feeding the gas to the burner.

In a third aspect, the invention is directed to a method for heating a tube comprising process gas to a temperature above 500° C. in an industrial process furnace comprising a firebox containing a burner and the tube, which method comprises subjecting an oxidant gas and/or a fuel gas to humidification, thereby obtaining a humidified gas; and superheating the humidified gas with a waste heat stream having a temperature below 100° C. before feeding the gas to the burner.

DETAILED DESCRIPTION

Figure 1:
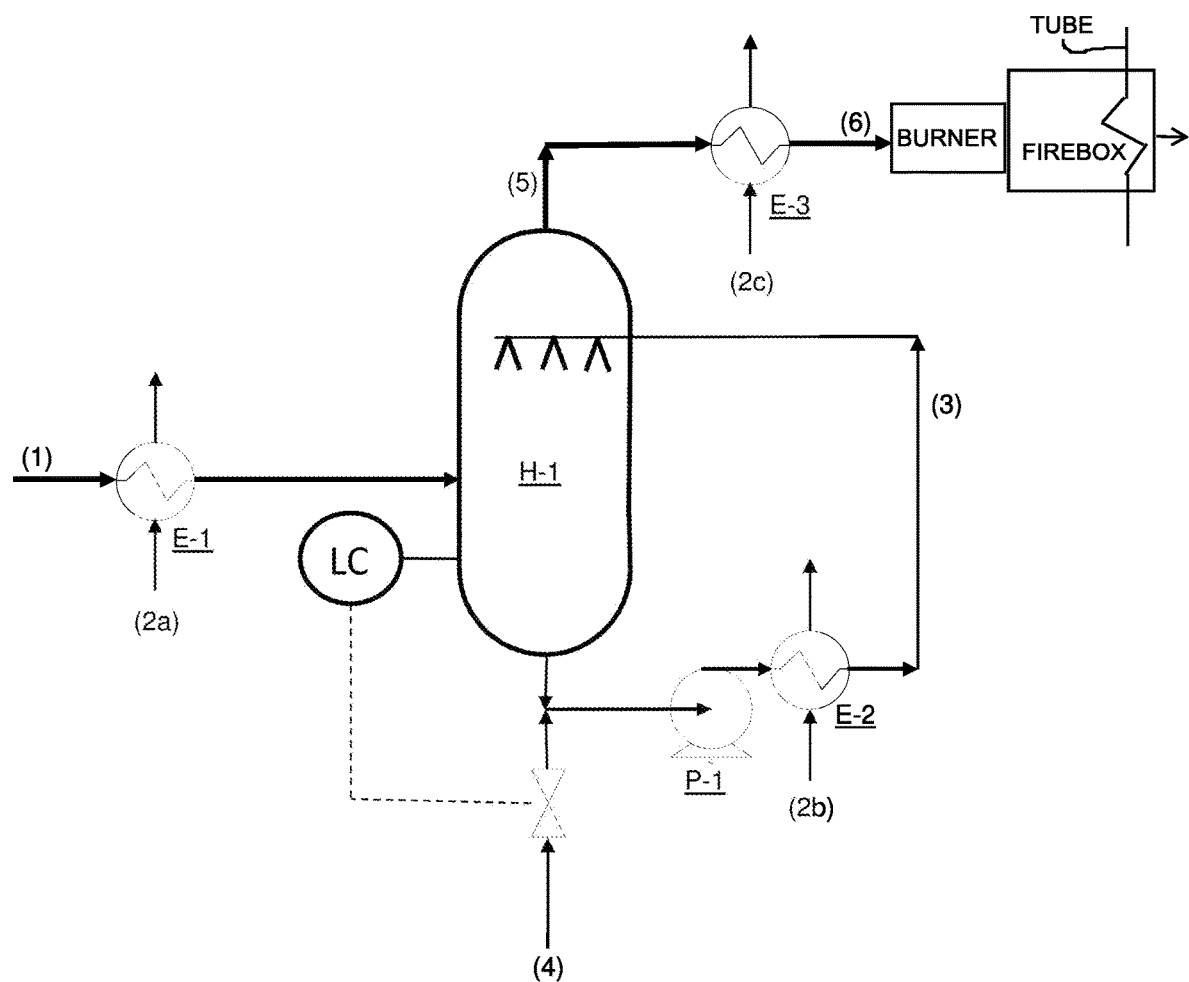
FIG. 1 shows an embodiment of the present invention.

The term "$NO_x$" as used herein refers to a generic term for mono-nitrogen oxides, such as nitric oxide (NO) and nitrogen dioxide ($NO_2$).

The term "oxidant gas" as used herein refers to a gas mixture comprising a suitable oxidizing agent for combusting the fuel. The oxidizing agent is generally oxygen. A suitable oxidant gas is air, which under normal circumstances will comprise a sufficient amount of oxygen. When air is used as the oxidant gas, the skilled person typically refers to the air as combustion air. It will be understood that besides combustion air there are many other oxygen containing gas mixtures which would be suitable as oxidant gas.

The term "superheating" as used herein refers to the step of heating the oxidant gas further after humidification. This heating step is typically conducted in a superheater.

The term "and/or" as used herein both refers to the separate individual options, as well as to the combination of the two options. Accordingly, the term "oxidant gas and/or a fuel gas" as used above is intended to encompass the embodiment wherein only oxidant gas is humidified and pre-heated, the embodiment wherein only fuel gas is humidified and pre-heated and the embodiment wherein both oxidant gas and fuel gas are humidified and pre-heated.

For convenience, the method of the invention will herein below be mostly described with respect to the oxidant gas. However, it will be understood that the method of the invention can similarly be applied to the fuel gas instead of (or in addition to) the oxidant gas.

The terms "a" or "an" as used herein may refer to "at least one" or "one or more", unless specifically stated otherwise. For example, the superheated humidified gas in the method of the invention is fed to one or more burners.

The term "industrial process furnace" is directed to furnaces applied in industry, in particular in chemical industries, e.g. in chemical plants. The furnace may sometimes also be referred to as a fired heater.

The term "waste heat stream" as used herein refers to a liquid or vapor stream carrying waste heat. In particular, it may refer to a liquid or vapor stream which carries heat produced in an industrial process, typically a chemical process, which process may be conducted in the plant in which the method of the invention is carried out. The waste heat stream is typically an external waste heat stream, i.e. a heat stream located outside the firebox, and may in particular refer to a heat stream that does not, or at least not directly, originate from the firebox. Thus, an external waste heat stream is a stream other than the high-temperature process gas streams exiting the firebox. Examples of such high-temperature process gas streams are the product gas stream and the flue gas stream exiting the firebox, which may have temperatures well above 200° C., typically above 400° C.

The waste heat streams used in the invention generally have a temperature below 100° C. Accordingly, the waste heat streams used in the invention may also be referred to as a low-temperature waste heat stream. Such heat streams may be considered to be relatively cheap, as there are generally not enough applications in a plant to use all energy/heat from such streams. The waste heat streams used in the invention may in particular have a temperature of 40-100° C., preferably of 55-90° C., more preferably of 60-70° C.

An example of a suitable waste heat stream that can be used in the method of the invention is a stream obtained in quenching, such as a quench water stream of an ethylene plant. Such quench water typically has a temperature of about 80° C. after quenching. Other examples of suitable low-temperature waste heat streams that may be used in the method of the invention are blow down water from a steam drum, product or reformed gas to an air cooled heat exchanger, cooling water from a cooling water return header, gas to a compressor inter-stage cooler, condensate from separators and vent steam from a degasifier.

In the invention, different steps may make use of waste heat streams, such as for example in the pre-heating step, in the humidification step (to heat water) and in the superheating step. Although the same waste heat stream may in principle be used for all steps, this is not necessary. Each step may make use of the same or different waste heat streams.

Industrial process furnaces typically comprise a firebox, which is the chamber where combustion takes place. The firebox comprises one or more tubes (containing the fluid to be heated) and one or more burners (for combustion). Fuel flows into the burner and is burnt with an oxidant gas (typically combustion air) that may be provided by an injector. There can be more than one burner in a firebox which can be arranged to heat a particular set of tubes. The same oxidant gas feed is typically routed to all burners of the firebox. Burners can be floor mounted, wall mounted or roof mounted depending on design. The flames heat up the tubes, which in turn heat the fluid inside in the tubes. The heat is transferred mainly by radiation to the tubes. The fluid flows through the tubes and is thus heated to the desired temperature. The gases produced by combustion are known as flue gas. The flue gas and the heated fluid (herein also referred to as product gas) exit the firebox while still having a very high temperature. Most furnaces include a convection section wherein heat is recovered.

The invention may be used in industrial process furnaces. Examples of industrial process furnaces wherein the method of the invention may be suitably used are steam reforming furnaces, cracking furnaces (e.g. ethylene cracking furnaces or ethylene dichloride cracking furnaces), furnaces for direct reduction of iron ore and styrene process steam heaters. The invention may also be applied in other high-temperature pyrolysis furnaces.

Examples of processes that can be suitably conducted in process furnaces using the present invention are cracking (e.g. thermal cracking, hydrocracking, ethylene cracking, ethylene dichloride cracking), reforming (e.g. catalytic reforming), direct reduction or iron ore for producing direct-reduced iron (DRI) and styrene production (e.g. from ethylbenzene) processes using steam.

The method of the invention may comprise only two steps: a humidification step and a superheating step. However, in a preferred embodiment, the method of the invention also comprise a pre-heating step. This step is conducted prior to the humidification step and is described further below.

Prior to the humidification step, the oxidant gas typically has a temperature in the range of −20 to 30° C., more typically in the range of 0 to 20° C. Preferably, the oxidant gas has a temperature above 0° C., more preferably above 5° C. In case the oxidant gas is not pre-heated, it will have ambient temperature when being fed to the humidifier.

Since the invention makes use of low-temperature waste heat streams to provide heat to the humidification and superheating steps, these steps are generally conducted at a temperature below 100° C., typically below 80° C.

In the humidification step, the oxidant gas is humidified. In this step, the oxidant gas is contacted with water, e.g. by spraying the water onto the oxidant gas, in order to increase the humidity of the oxidant gas. The relative humidity (RH) of the oxidant gas may be increased to at least 60%, preferably at least 70%, more preferably at least 80%, even more preferably at least 90%. Most preferably, the oxidant gas is saturated with water vapor during humidification (RH=100%).

The water used for humidification may have a temperature of 20-60° C., preferably of 25-50° C. when contacted with the oxidant gas. The inventors realized that only a few percent of steam is required in the oxidant gas to have the desired effect on $NO_x$ emission. Thus, the temperature of the water used to humidify the oxidant gas does not need to be high for oxidant gas to take up sufficient water. Therefore, water with a relatively low temperature can suitably be used to humidify the oxidant gas to such an extent that a significant reduction of the $NO_x$ emission is established in the burners. The water temperature can be suitably chosen to be about 5° C. higher than the desired temperature for the humidified oxidant gas to be obtained. In order to obtain water of the desired temperature, water may be brought into thermal contact with a (typically low-temperature) waste heat stream, which may be achieved using a heat-exchanger. The waste heat stream may have a temperature of 40-100° C., preferably of 55-90° C., more preferably of 60-70° C.

During humidification water transfers heat to the oxidant gas, thereby increasing the temperature of the oxidant gas. Only a part of the water used for humidification actually vaporizes and is taken up by the oxidant gas. Typically, about 4 percent of the hot water vaporizes and the remaining 96 percent of the hot water remains liquid.

Humidification is conducted in a humidifier. The humidifier can for example be designed as a saturator or a cooling tower. A suitable saturator may be a saturator with packing. A suitable cooling tower may for example be a wet atmospheric cooling tower with fill.

A packing or a fill can be installed in the humidifier for heat transfer enhancement and mass transfer enhancement.

The humidifier may further comprise a drift eliminator and/or mist eliminator. Water droplets that are carried out of the humidifier with the humidified oxidant typically have the same concentration of impurities (if any) as the hot water entering the humidifier. The amount of entrained droplets can be reduced by employing one or more baffles in or downstream of the humidifier, for example by using a drift eliminator. In addition, or alternatively, a mist eliminator can be employed in or downstream of the humidifier, through which the humidified oxidant must travel after leaving the packing or fill of the humidifier.

The humidifier may be designed in counter-flow, cross-flow or co-current flow. In a counter-flow humidifier, the oxidant gas and water travel in opposite directions, e.g. the oxidant travels upward, while the water moves downward. In a cross-flow humidifier, oxidant gas travels horizontally as the water moves downward. In a co-current humidifier both oxidant gas and water move in the same direction, typically downward.

The water used for humidification may be water circulating between the humidifier and a heat exchanger, wherein the water is heated in the heat exchanger to a temperature of preferably between 20-60° C., more preferably to 30-50° C. The water not taken up by the oxidant gas in the humidifier may be circulated by a circulation water pump to a heat exchanger (also referred to as the circulation water heater) to be heated again. The heated water may then be re-used in the humidifier.

Since the humidifier uses relatively hot water, the oxidant gas will be heated in the humidification step. The humidified oxidant gas produced in the humidification step may have a temperature of 20-50° C., preferably 20-40, more preferably 25-35° C. The temperature of the oxidant gas may be increased by 5-40° C., preferably 10-25° C., by the humidification step.

The purity of the water is not particularly critical. Since the water taken up by the oxidant gas will generally have been evaporated from the water, it will be free of minerals. Purification of the water used for humidification is typically not required. Nevertheless, to avoid scaling of e.g. minerals or salts in the humidifier, it may be desirable to use demineralized water or to use a blow down.

The water may be contacted with the oxidant gas in the humidifier by spraying the water onto the oxidant gas. In order to deal with possible corrosive conditions, the inner walls of the humidifier may be produced from stainless steel material. Alternatively, a protective coating may be applied to the inner walls of the humidifier.

It can be calculated that for a typical humid air temperature of 25° C. and a humidity of 2.5-3.2 vol. %, the $NO_x$ reduction of burners in a furnace is 25-30%.

In the superheating step, the humidified gas is further heated before feeding the gas to the burners. It is the goal of the pre-heating step to increase the fuel efficiency during combustion by increasing the temperature of the humidified gas. The temperature of the humidified gas may be increased by at least 5° C., preferably at least 10° C., more preferably by at least 15° C., even more preferably at least 25° C. Since external waste heat is used, the temperature is generally not increased by more than 40° C., typically not by more than 30° C.

The superheating step may be conducted by bringing the humidified gas in thermal contact with an external waste heat stream, which may be achieved using a heat-exchanger. The external waste heat stream may have a temperature of 40-100° C., preferably of 55-90° C., more preferably of 60-70° C.

The superheating step may be conducted in a heat-exchanger. Preferably, the heat-exchanger has an extended surface (e.g. fins). Such a surface may enhance heat transfer to the humidified oxidant gas stream. In the superheating step, the humidified oxidant gas is converted to a superheated oxidant gas. The pressure is preferably about atmospheric pressure during superheating and does typically not change significantly during this step.

After the superheating step, the humidified oxidant gas may have a temperature of at least 35° C., preferably at least 40° C., more preferably a temperature in the range of 50-60° C. The final temperature that can be achieved mainly depends on the temperature of the external waste heat stream. The temperature is therefore generally lower than 100° C., typically lower than 75° C. No further superheating steps are required to increase the temperature above these temperature ranges.

After superheating, the superheated humidified oxidant gas is fed to one or more burners.

As mentioned above, the method of the invention may further comprise a pre-heating step. In most locations where furnaces are operating, the ambient temperature drops below 0° C. in winter. The inventors found that in such furnaces the invention may not work well due to icing issues. In regions in the plant where the ambient temperature can drop below water freezing temperature (0° C.) severe icing problems can occur when conducting the method of the invention. Subcooled water droplets or subcooled vapor may freeze in the oxidant gas stream or on contact with cold duct walls or obstructions, resulting in higher pressure loss or even blockage of the oxidant flow. The inventors found that these risks can be avoided or at least reduced by conducting a pre-heating step. Such a step may in particular be desirable if the oxidant gas temperature has a low temperature, e.g. a temperature below 5° C., in particular a temperature of 0° C. or lower. As explained above, this may happen quite often in furnaces, especially during winter. If the oxidant gas temperature is above 0° C. in every region of the plant, the pre-heating step is generally not required.

Furthermore, the pre-heating step may further contribute to the efficiency of the humidification step, and thus to the overall efficiency of the plant. The pre-heating step provides for an easy and cost effective way to provide the humidifier with a gas stream with a desirable temperature. In this way, the pre-heating step allows the humidifier to operate in the most desirable temperature range.

The pre-heating step is conducted upstream of the humidification and superheating steps described above. In the pre-heating step, the gas is heated to a temperature above 0° C., preferably to a temperature of at least 5° C. In view of the subsequent humidification step, the oxidant gas is generally heated to a temperature below 50° C., preferably below 35° C. The pre-heating step may be conducted by bringing the oxidant gas in thermal contact with a low-temperature waste heat stream (as defined above), which may be achieved using a heat-exchanger. Preferably, the heat-exchanger has an extended surface (e.g. fins) to enhance heat transfer to the oxidant gas stream.

It is neither necessary nor desirable to conduct the pre-heating, humidification and superheating under elevated pressure. Accordingly, the oxidant gas may have a pressure during pre-heating, humidification and superheating that is typically below 1.5 times the atmospheric pressure, typically within 0.9-1.1 times the atmospheric pressure, more preferably about atmospheric pressure. The gauge pressure of the oxidant gas may in each of the pre-heating, humidification and superheating be independently chosen to be less than 0.07 bar, preferably less than 0.04 bar, preferably in the range of 0.04 to 0.02 bar.

The pressure drop over each of the pre-heater, humidifier and superheater is generally less than 0.05 bar, preferably about 0.001 bar or less. The furnace design will generally determine the exact pressure profile (burners, oxidant gas or fuel gas pre-heating, draft in firebox etc.).

The flow of the oxidant gas may be promoted by a forced-draught fan and/or an induced-draught fan. A forced-draught fan may be located upstream or downstream of the humidifier.

FIG. 1 shows an embodiment of the present invention. Oxidant gas or fuel gas (1) is fed to a pre-heater (E-1), wherein heat is exchanged with a low-temperature waste heat stream (2a). Subsequently, the oxidant gas or fuel gas is fed to a gas humidifier (H-1), wherein the oxidant gas or fuel gas is humidified by spraying hot water (3) into the humidifier. The water used in the humidifier is heated prior to spraying by a circulation water heater (E-2), which water is routed to the humidifier by a circulation water pump (P-1). Water (4) may be added to balance the amount of water present in the water circulation. The humidified oxidant gas or fuel gas (5) is then routed to the gas superheater (E-3), wherein heat is exchanged with a low-temperature waste heat stream (2c). The pre-heated humidified oxidant gas or fuel gas (6) is then routed to a burner (not shown).

The inventions is further illustrated in the Example below.

Example: Effect of Humidified Gas Temperature on Fired Heat

This example illustrates the effect of superheating the humidified gas (combustion air) on fired heat.

Figure 2:
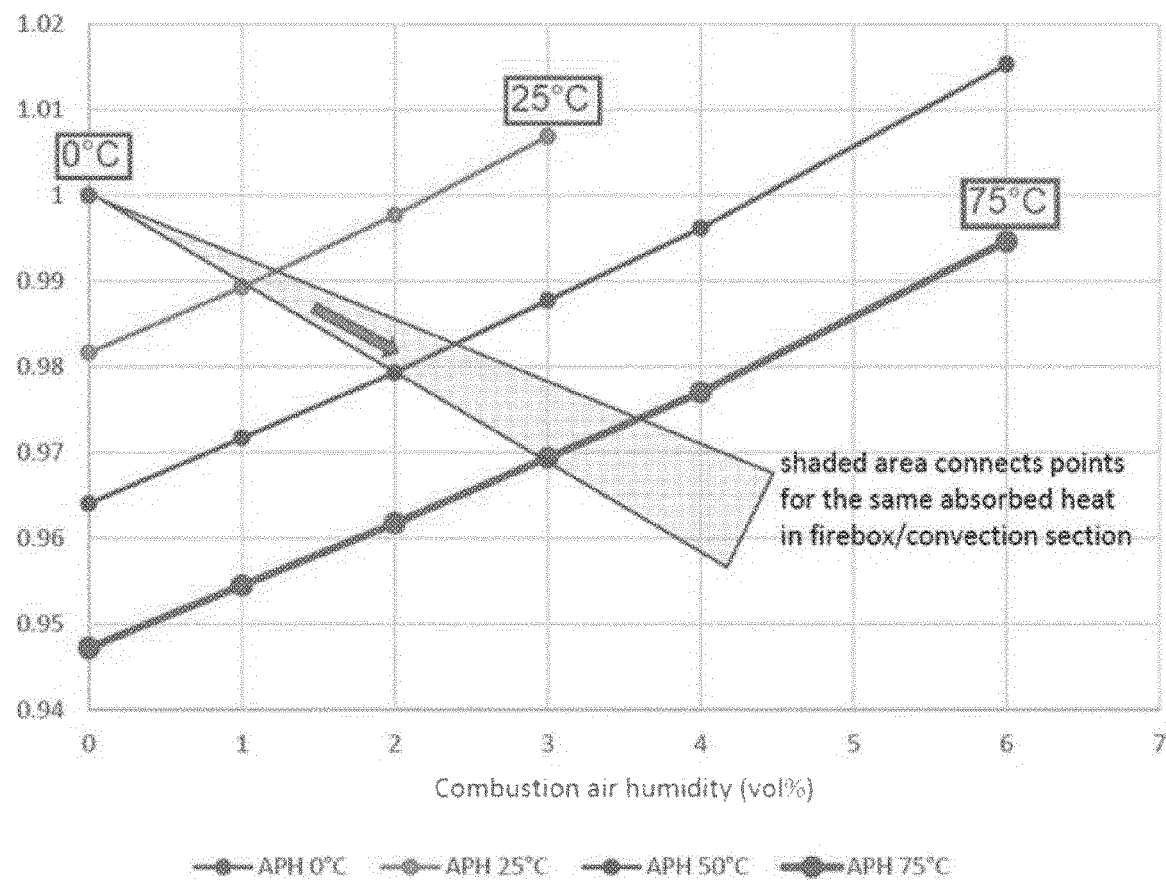
FIG. 2 is a chart that depicts the effect on the relative fired heat that was calculated in an ethane cracking furnace using SPYRO simulation software.

The effect on the relative fired heat was calculated in an ethane cracking furnace using SPYRO simulation software. The results are shown in FIG. 2.

The effect was calculated at four different temperatures of the humidified gas (0° C.; 25° C.; 50° C.; 75° C.) and at different values of the humidity (0 vol. %; 1 vol. %; 2 vol. %; 3 vol. %; 4 vol. % and 6 vol. %).

Only one data point (0 vol. %) was calculated for the superheated gas at 0° C., as the humidity can only be very low for this temperature. The upper curve in FIG. 2 corresponds to a superheated gas temperature of 25° C. This curve ends at 3 vol. % humidity, because at this point 100% relative humidity is reached. The middle curve in FIG. 2 corresponds to a superheated gas temperature of 50° C., while the bottom curve corresponds to a superheated gas temperature of 75° C.

After having calculated the relative fired heat, certain data points were connected that have the same absorbed heat in the radiant section and the same absorbed heat in the convection section (same export steam amount). The area thus obtained is indicated in FIG. 2 by the shaded triangle. The data points below the shaded area have less absorbed heat in the convection center, while the points lying above the shaded area have a higher absorbed heat in the convection section.

FIG. 2 indicates that the relative fired heat can be reduced to 0.97 when the humidified gas has is superheated to a temperature of 75° C. at a humidity of 3.5 vol. %. This reduction in fired heat thus shows that the change in temperature results in a significant increase of the efficiency of the heaters and the plant.

The invention claimed is:

1. A method for reducing $NO_x$ emission from a process furnace comprising a firebox containing a burner and a tube, the method comprising:
    subjecting an oxidant gas and/or a fuel gas to humidification, thereby obtaining a humidified gas; and
    superheating the humidified gas with an external waste heat stream and thereafter feeding the superheated, humidified gas to the burner, wherein the external waste heat stream has a temperature in the range of 40-100° C., wherein the temperature of the humidified gas in the superheating step is increased by at least 10° C.

2. A method for combusting fuel gas with oxidant gas in a process furnace comprising a firebox containing a burner and a tube, the method comprising:
    subjecting an oxidant gas and/or the fuel gas to humidification, thereby obtaining a humidified gas; and
    superheating the humidified gas with an external waste heat stream and thereafter feeding the superheated, humidified gas to the burner, wherein the external waste heat stream has a temperature in the range of 40-100° C., wherein the temperature of the humidified gas in the superheating step is increased by at least 10° C., wherein the humidification step results in a humidified gas of 20-50° C., wherein the humidified gas is superheated to a temperature of 40-75° C.

3. A method for heating a tube to a temperature above 500° C. in a process furnace comprising a firebox containing a burner and the tube, the method comprising:
    subjecting an oxidant gas and/or a fuel gas to humidification, thereby obtaining a humidified gas; and
    superheating the humidified gas with an external waste heat stream and thereafter feeding the superheated, humidified gas to the burner, wherein the external waste heat stream has a temperature in the range of 40-100° C., wherein the temperature of the humidified gas in the superheating step is increased by at least 10° C.

4. The method according to claim 1, wherein the oxidant gas is combustion air.

5. The method according to claim 1, wherein the oxidant gas and/or fuel gas that is to be subjected to humidification has a temperature of 0-30° C.

6. The method according to claim 1, wherein the humidified gas obtained from subjecting the oxidant gas and/or a fuel gas to humidification has a first temperature of 20-50° C., wherein the superheated humidified gas obtained from superheating the humidified gas with an external waste heat stream, has a second temperature of 40-75° C., with the proviso that the second temperature is at least 5° C. higher than the first temperature feeding the humidified gas to the burner.

7. The method according to claim 1, wherein the external waste heat stream used for superheating has a temperature of 55-90° C.

8. The method according to claim 1, wherein the waste heat stream is a stream of quenching water, blow down water from a steam drum, product or reformed gas to an air cooled heat exchanger, cooling water from a cooling water return header, gas to a compressor inter-stage cooler, condensate from separators or vent steam from a degasifier.

9. The method according to claim 1, wherein humidification is conducted in a humidifier using water having a temperature of 25-50° C.

10. The method according to claim 1, wherein the oxidant gas and/or fuel gas is heated to a temperature above 0° C. prior to humidification.

11. The method according to claim 1, wherein the process furnace is at least one of a steam reforming furnace, a cracking furnace, an ethylene cracking furnace, an ethylene dichloride cracking furnace, a furnace for direct reduction of iron ore or a styrene process steam heater.

12. The method according to claim 1, further comprising pre-heating the oxidant gas and/or the fuel gas.

13. The method according to claim 2, further comprising pre-heating the oxidant gas and/or the fuel gas.

14. The method according to claim 2, wherein the oxidant gas is combustion air.

15. The method according to claim 3, further comprising pre-heating the oxidant gas and/or the fuel gas.

16. The method according to claim 1, wherein oxidant gas is humidified and the oxidant gas has pressure during humidification and superheating that is below 1.5 times the atmospheric pressure.

17. The method according to claim 1, wherein the oxidant gas and/or the fuel gas is humidified in a humidifier and superheated in a superheater, wherein a pressure drop over each of the humidifier and the superheater is less than 0.05 bar.

18. The method according to claim 2, wherein oxidant gas is humidified and the oxidant gas has pressure during humidification and superheating that is below 1.5 times the atmospheric pressure.

19. The method according to claim 2, wherein the oxidant gas and/or the fuel gas is humidified in a humidifier and superheated in a superheater, wherein a pressure drop over each of the humidifier and the superheater is less than 0.05 bar.

20. The method according to claim 3, wherein oxidant gas is humidified and oxidant gas has pressure during humidification and superheating that is below 1.5 times the atmospheric pressure.

21. The method according to claim 3, wherein the oxidant gas and/or the fuel gas is humidified in a humidifier and superheated in a superheater having, wherein a pressure drop over each of the humidifier and the superheater is less than 0.05 bar.

22. The method according to claim 12, wherein the pre-heating is conducted in an air pre-heater system comprising a forced-draught fan, an induced-draught fan, or both.

23. The method according to claim 3, wherein the oxidant gas is combustion air.

* * * * *